Patented Sept. 4, 1951

2,566,352

UNITED STATES PATENT OFFICE 2,566,352

COMPOUNDS WITH CONJUGATED DOUBLE BONDS, THEIR OXIDATION PRODUCTS, AND PROCESS FOR PREPARING SAME

Charles Meystre, Basel, Placidus A. Plattner, Zurich, and Albert Wettstein, Basel, Switzerland, assignors to Ciba Pharmaceutical Products, Inc., Summit, N. J.

No Drawing. Application April 22, 1947, Serial No. 743,190. In Switzerland April 30, 1946

7 Claims. (Cl. 260—239.57)

The present invention relates to compounds which contain a three- or more-fold conjugation of carbon-carbon double bonds, to their oxidation products and to a process for the preparation thereof.

It has not heretofore been possible to use the method for the introduction of halogen with the aid of N-bromosuccinimide into methylene groups in α-position to an olefine double bond, in connection with compounds which contain a two-or more-fold conjugated system instead of a simple double bond (see Ziegler et al., Annalen der Chemie, 551, 97 [1942]). Even less successful was the halogenation of a methyl or methine group in α-position to the conjugated system of a poly-olefine, since such groups even in α-position to a single double bond react more difficultly than methylene groups. Accordingly, it has heretofore been possible to produce a three- or more-fold conjugation of carbon-carbon double bonds with the aid of the said halogenation method and subsequently dehydrohalogenation, only by first simultaneously halogenating the two α-positions of a single double bond, or if the halogenation could take place at carbon atoms standing between isolated double bonds (see Ziegler et al., loc. cit., page 99 et seq.; Ruzivka et al., Helvetica Chimica Acta, 26, 1236 [1943]; Karrer et al., Helvetica Chimica Acta, 28, 793 [1945]).

It has now been found that, unexpectedly, compounds with at least three conjugated carbon-carbon double bonds can be prepared by treating, in the presence of light, di- or poly-olefines with conjugated double bonds which contain at least one methylene or methine group in α-position of the conjugated system, with carboxylic acid imides, amides or arylamides, which are halogenated at the nitrogen, and dehydrohalogenating the resultant halogen compounds.

As starting materials for the new process, there may serve any compounds which contain two or more conjugated carbon-carbon double bonds in an aliphatic, alicyclic or heterocyclic radical and contain at least one methylene or methine group in α-position, i. e., in allyl position, to the said conjugated system. Accordingly, there are suitable for example: 1:1-diphenyl-hexadiene-(1:3), octadiene (3:5) (prepared e. g. from corresponding monoenes according to the bromosuccinimide method); cyclohexadiene-(1:3); menthadienes, such as α- and β-phelandrene; di-, tetra- and hexahydro-aerophtol esters, especially those with the conjugated system in α-position to the esterified carbinol group (prepared e. g. from $\Delta^2$-3:7-dimethyl-9-(1':1:3'-trimethyl - cyclohexyl - 2') - nonenol - (1) - acylates according to the bromo-succinimide method); and more particularly also compounds of the steroid series with conjugated double bonds in the ring structure and/or in the side-chain, such as $\Delta^{2:4}$-, $\Delta^{3:5}$-, $\Delta^{5:7}$-, $\Delta^{7:14}$-, $\Delta^{16:20}$-, $\Delta^{22:24}$-compounds, for examples $\Delta^{16:20}$-3-acyloxy- or $\Delta^{16:20}$-3-keto-21-hydroxy-nor-choladienic acid lactones, $\Delta^{22:24}$ - 3 - keto - 12 - acyloxy - 25:25 - diphenyl - homocholadienes, $\Delta^{22:24}$-3:11-diketo- or $\Delta^{22:24}$-3:12 - diketo - 25:25 - diphenyl - homo-choladienes, $\Delta^{22:24}$ - 3:12 - diacyloxy - 25:25 - diphenyl - homo - choladienes, $\Delta^{5:22:24}$ - 3 - acyloxy-25:25 diphenyl- or -25-dimethyl- or -25-methyl-25-phenyl-homo-cholatrienes, as well as analogous compounds which contain an 11:12-double bond instead of substituents in 11- or 12-position.

In lieu of compounds of the steroid series with conjugated side-chain double bonds and a further double bond in the cyclopentanopolyhydrophenanthrene nucleus it is of advantage to use compounds whose nuclear double bond is protected, e. g. by saturation with halogen or particularly with hydrogen halide, if such protection is not rendered superfluous by the relatively inert character of the double bond. The latter is the case e. g. with C=C groupings which contain a keto group in α-position or with those which are situated between two tertiary carbon atoms. Compounds with a protected nuclear double bond are prepared, e. g. by protecting the nuclear double bond of cyclopentanopolyhydrophenanthrene compounds which initially have only one double bond in the side chain, halogenating, e. g. with carboxylic acid imides, and splitting off of hydrogen halide under conditions which do not affect the protection of the nuclear double bond, e. g. by simple heating.

The above keto-group-containing polyenes can be obtained, e. g. from the corresponding hydroxy-polyenes, part of the hydroxyl groups of which may if necessary be present in esterified form (partial acylation of polyhydroxy compounds or partial saponification of poly-acyloxy compounds), by the action of aluminium alcoholates and ketones; 11-keto-polyenes are advantageously prepared from 11-keto-acid esters by Grignardation and introduction of the double bonds. The 11:12-unsaturated steroids can be prepared e. g. from compounds, which have in the 12-position a radical which can be split off (such as a benzoyloxy, anthraquinone-carboxy, p-toluol-sulfoxy or methanesulfoxy group) by splitting off of the said radical together with a hydrogen atom at the 11-carbon atom.

The starting materials are treated with dicarboxylic acid imide derivatives which are halogenated at the nitrogen, i. e. substituted for example by chlorine, bromine or iodine, such as N-halogen-succinimides, -phathalimides, -parabanic acids, -cyanuric acids, -hydantoins or -barbituric acids. In lieu thereof, use may also be made of corresponding derivatives of primary or secondary carboxylic acid amides, such as of acetamide, propionamide or diacetamide, or of carboxylic acid anilides, e. g. of nuclearly halogenated or nitrated acetanilides or benzanilides. The thus-effected halogenation of the methylene or methine groups in α-position to the conjugated system is, according to the invention, carried out in the presence of light. For this purpose, use may be made of various sources of light with and without an ultraviolet portion, such e. g. as light from incandescent lamps, quartz lamps, arc lamps and also strong natural light such as direct sunlight. The exposure to light presents primarily the advantage that the rate of the reaction is greatly enhanced. In many cases, it is due to this expedient that acceptable yields become possible at all. Moreover, side reactions are to a great extent suppressed. The introduction of halogen is preferably effected in inert solvents or diluents, such as carbon tetrachloride, chloroform, benzene, cyclohexane, methylcyclohexane, ethyl ether or dioxane. The reactants are in most cases employed in substantially stoichiometric quantities.

If the starting materials are compounds containing substituents which are sensitive to the halogenating means, these substituents may be temporarily protected; particularly are free hydroxyl groups e. g. esterified or etherified. Esters of aromatic acids, such as benzoic acid, are in contrast to the free hydroxyl compounds quite stable toward the said halogenating means, and also esters of aliphatic acids are generally more slowly attacked than the active methylene or methine groups. If necessary, free keto groups can be protected by conversion into acetals particularly of glycols. It has been found, however, that free keto groups and particularly isolated groups or those in conjugation to a carbon double bond are also relatively little sensitive.

Hydrogen halide is then split off from the crude or preliminarily purified halogenated products, and in this way additional conjugated double bonds may be introduced. For this purpose, use is made especially of dehydrohalogenating agents, e. g. basic agents such as tertiary amines (pyridine, collidine, quinoline, dimethylaniline or the like). The splitting off of the halogen may also be effected by simple heating, so that after the halogenating agent has acted, it is only necessary to continue the boiling.

The conjugated double bond thus newly formed in the reaction products can be split up in a direct or indirect oxidative manner, known per se. Mention may here be made by way of example of oxidation by means of a compound of hexavalent chromium such as chromic acid, ozonization and splitting of the ozonide, the action of peroxides such as benzoyl peroxide, monoperphthalic acid or hydrogen peroxide, preferably in presence of osmium tetroxide, and the splitting of the glycols formed during the hydrolysis of the oxide ring or by the direct addition of two hydroxyl groups to each of the double bonds, e. g. by means of chromic acid, lead tetra-acetate or periodic acid. It is also preferable during the oxidation to protect sensitive substituents such as hydroxyl groups in per se known manner, e. g. by esterification or etherification, and to partly or wholly return them back to the free state after the oxidation, e. g. by the action of hydrolyzing means. However, in case a conversion of nuclear hydroxyl groups, which may be present, to keto groups is desired, this may be carried out in per se known manner prior to, during or after the oxidative splitting up of the new conjugated double bond, especially by the action of oxidizing or dehydrogenating agents. As oxidizing agents, use may here also be made of e. g. chromic acid, permanganate, etc.; as dehydrogenating agents use may be made particularly of metal alcoholates or phenolates and carbonyl compounds or e. g. metal powder with the aid of heat and vacuum.

Protected nuclear double bonds can be regenerated in any stage after halogenation. When such protection was effected e. g. by saturation with halogen or hydrogen halide, the nuclear double bond may be regenerated in per se known manner by splitting off halogen or hydrogen halide, respectively.

The products obtainable according to the new process can be isolated as usual and can be purified for example by recrystallization, chromatography, sublimation, reaction with ketone reagents, especially with those which give water-soluble condensation products, or by extraction with solutions of strong acids or their salts or with basic agents.

The products of the process which contain at least three conjugated carbon-carbon double bonds are very useful. Some of them are physiologically active or may serve as intermediates for the preparation of pharmaceuticals. Especially valuable are compounds of the steroid series, and among them, those which have at least one of the conjugated carbon-carbon double bonds in the side-chain. Mention may be made e. g. of $\Delta^{14:16:20}$-21-hydroxy-nor-cholatrienic acid lactones or $\Delta^{17:22:24}$-25:25-diphenyl-homocholatrienes. These compounds may contain hydroxy, acyloxy or keto groups in 3-, 11- or 12-position and double bonds in 5:6- or 4:5-position, respectively.

The following examples illustrate the invention without however, being intended to be limitative thereof. The relationship between parts by volume and parts by weight is the same as that which exists between the liter and the kilogram.

*Example 1*

1 part by weight of $\Delta^{16:20}$-3-acetoxy-21-hydroxy-nor-allocholadienic acid lactone in 180 parts by volume of carbon tetrachloride is boiled under the reflux for two hours with 0.51 parts by weight of N-bromo-succinimide while being exposed to light. The carbon tetrachloride is then evaporated off in vacuo and the residue is heated to boiling for 45 minutes in 45 parts of pyridine, and after addition of 18 parts of acetic anhydride is boiled for 10 more minutes. The reaction solution is then evaporated to dryness in vacuo, the residue taken up in ether-solution washed with 2n-hydrochloric acid, water and sodium bicarbonate solution, dried and treated with a small quantity of animal charcoal and then with aluminium oxide. The crude product obtained by evaporating the purified ether-solution is chromatographed on 18 parts by weight of aluminium oxide, and there is then obtained from the benzene-ether eluates by recrystallization from acetone-alcohol $\Delta^{14,16,20}$-3-acetoxy-21-hydroxy-nor-allo-cholatrienic acid lactone of M. P. 243–244° C.

The substance is colored brown with tetranitromethane, given a positive legal test and has a strong absorption band in the U. V.-spectrum at 332 Å.

Example 2

1 part by weight of $\Delta^{22}$-3-acetoxy-5-chloro-24-diphenyl-methylene-cholene ($\Delta^{22,24}$-3-acetoxy-5-chloro-25, 25-diphenyl-homocholadiene) of the formula

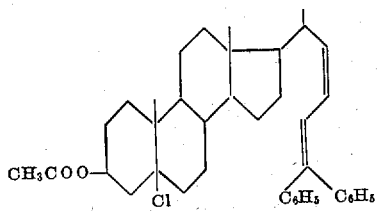

(which can be prepared e. g. from $\Delta^5$-3-hydroxy-cholenic acid by side-chain elongation according to Arndt-Eistert, reaction of the resultant homo-acid ester with phenyl magnesium halide, splitting off of water to form the diphenyl-ethylene, acetylation addition of hydrogen chloride to the 5,6-double bond, bromination by means of bromosuccinimide and thermal splitting off of hydrogen bromide with formation of a conjugated double bond) and 0.31 part by weight of N-bromosuccinimide are heated to boiling in 15 parts by volume of carbon tetrachloride while exposing to light with a strong incandescent lamp. Then the solution is cooled and suction-filtered from the formed succinimide.

For splitting off hydrogen bromide and hydrogen chloride, dimethylaniline is added to the filtrate, the carbon tetrachloride is distilled off, and the concentrated solution is heated to boiling for a short time. It is then diluted with ether, the dimethylaniline removed by shaking with dilute sulfuric acid and the ether-solution dried and evaporated. By recrystallization of the residue with an acetone-methanol mixture pure $\Delta^{5,17,22}$-3-acetoxy - 24 - diphenylmethylene - cholatriene is obtained.

For saponification this substance is boiled for 1 hour under the reflux with 0.3 part by weight of potassium hydroxide in 10 parts by volume of ethyl alcohol, the solution evaporated in vacuo, and ether and water added to the residue. From the ether layer, $\Delta^{5,17,22}$-3-hydroxy-24-diphenylmethylene-cholatriene is obtained.

This hydroxy-triene is, to effect oxidation in the 3-position, boiled with a solution of 9 parts by volume of cyclohexanone in toluol, and a solution of 0.17 part by weight of aluminium isopropylate in toluol is added dropwise to the slowly distilling solution. The cooled solution is then mixed with an aqueous concentrated Seignette salt solution and subjected to steam distillation. The cooled distillation residue is extracted with ether, the ether solution dried with sodium sulfate and evaporated. There results the $\Delta^{4,17,22}$-3-keto-24-diphenyl-methylene-cholatriene.

This substance is taken up in a mixture of 30 parts by volume of chloroform, 27 parts by volume of glacial acetic acid and a little water and, while cooling with ice, a solution of about 0.8 part by weight of chromium trioxide in 2 parts by volume of water and 27 parts by volume of glacial acetic acid is added thereto slowly and with stirring, so that the temperature does not rise above 3° C. The stirring is continued for a short time at 0° C. and then unconsumed chromium trioxide is decomposed with sodium bisulfide solution. After evaporating in vacuo, the residue is dissolved in water and shaken out with an ether-chloroform mixture. The ether-chloroform solutions are then washed with soda lye and water, dried and evaporated. The residue contains $\Delta^4$-androstene-3,17-dione, for the isolation of which it is dissolved in 10 parts by volume of benzene and shaken out several times with 50 percent by volume sulfuric acid. The sulfuric acid solutions are diluted with water, extracted with ether and the ether solutions washed neutral with soda lye and water. After drying and evaporating, the crude androstenedione remains behind. By recrystallization from hexane with addition of some animal charcoal, it is recovered in pure form with M. P. 173–174° C.

The splitting off of hydrogen bromide can also be effected by further long heating of the carbon tetrachloride solution. In this way there is obtained the $\Delta^{17,22}$-3-acetoxy-5-chloro-24-diphenyl-methylene-choladiene, which can be degraded, in manner analogous to that above described, to 3-acetoxy - 5 - chloro-androstane - 17-one. The latter compound, by simultaneous saponification and splitting off of hydrogen chloride, yields the known trans-dehydro-androsterone which crystallizes out of hexane or ether in two dimorphous forms of M. P. 140–141° C. or 152–153° C.

The $\Delta^{17,22}$-3-acetoxy-5 - chloro - 24 - diphenyl-methylene-choladiene can be hydrolyzed to the free 3-hydroxy-compound by an acid agent, while retaining the chlorine in 5-position. The free 3-hydroxy compound can be converted by chromic acid oxidation into 5-chloro-androstane-3,17-dione and the latter, by means of basic reagents such as carbonates or tertiary bases, into the aforedescribed $\Delta^4$-androstene-3,17-dione.

Example 3

10 parts by weight of α-phelandrene are dissolved in 100 parts by volume of carbon tetrachloride. To this solution 13 parts by weight of N-bromosuccinimide are added and the whole is heated to boiling for 20 minutes while being exposed to light from a strong incandescent lamp.

The cooled suspension is filtered to remove the formed succinimide, the clear filtrate is evaporated in vacuo, the residue mixed with 10 parts by volume of pyridine and the resultant solution is heated on the water-bath for one hour. It is diluted then with ether, the ether-solution washed with hydrochloric acid and water, dried and evaporated. The yellowish resdue is subjected to fractional distillation. The distillate passing over at 172–174° C. is collected and consists of pure para-cymol.

Example 4

1 part by weight of $\Delta^{22}$-3,12-diacetoxy-24-diphenyl-methylene - cholene ($\Delta^{22,24}$-3,12-diacetoxy - 25,25 - diphenyl - homocholadiene) of the formula

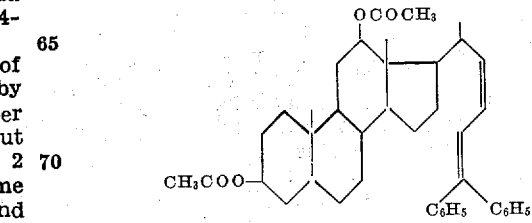

(obtainable for example from desoxy-cholic acid by side-chain elongation according to Arndt- Eistert, reaction of the resultant homo-acid-ester with phenyl magnesium halide, acetylation, splitting off of water to form the diphenyl-ethylene compound and introduction of a second, conjugated double bond according to the bromosuccinimide process) and 0.3 part by weight of N-bromo-succinimide are heated to boiling in 20 parts by volume of carbon tetrachloride while exposing to light with a strong incandescent lamp. Then the solution is cooled and suction-filtered from the formed succinimide.

For splitting off hydrogen bromide the greater part of the carbon tetrachloride is distilled off, and the concentrated solution is heated to boiling for 6 hours. It is then diluted with ether, the ether-solution dried and evaporated. By recrystallization from acetone-methanol-mixtures pure $\Delta^{17,22,24}$-3,12-diacetoxy-25,25-diphenyl-homocholadiene is obtained.

This compound is taken up in a mixture of 30 parts by volume of chloroform, 27 parts of glacial acetic acid and a little water and, while cooling with ice, a solution of about 0.8 part of chromium trioxide in 2 parts of water and 27 parts of glacial acetic acid is added thereto slowly and with stirring, so that the temperature does not rise above 3° C. The stirring is continued for a short time at 0° C. and then unconsumed chromium trioxide is decomposed with sodium bisulfite solution. After evaporating in vacuo, the residue is dissolved in water and shaken out with an ether-chloroform mixture. The ether-chloroform solutions are then washed with soda lye and water, dried and evaporated. The residue contains 3,12-diacetoxy-ethiocholane-17-one. From benzene-petroleum ether-mixtures it crystallizes in prisms of the melting point 160–162° C.

The splitting off of hydrogen bromide can also be effected by heating with a basic agent, e. g. a tertiary amine, such as dimethylaniline and collidine.

*Example 5*

10 parts by weight of α-phelandrene and 33.2 parts by weight of N-bromo-2,4,6-tribromoacetanilide are covered with 100 parts by volume of carbon tetrachloride and the solution boiled in a reflux apparatus for 15 minutes while being exposed to light from a strong incandescent lamp. The carbon tetrachloride is then removed under reduced pressure and the residue mixed with some ether. The formed tribromacetanilide is suction-filtered off, the ether is distilled off and the residue is heated on the boiling waterbath for one hour with 20 parts by volume of pyridine. The cooled solution is then mixed with ether, the ether-solution washed with dilute hydrochloric acid and water, dried and subjected to fractional distillation. Para-cymol boiling at 172–174° C. is thus obtained.

*Example 6*

13.6 parts by weight of α-phelandrene and 13.8 parts by weight of N-bromacetamide are covered with 100 parts by volume of carbon tetrachloride and the solution boiled under reflux for 20 minutes with exposure to light from a strong incandescent lamp. It is then freed in vacuo from the carbon tetrachloride, mixed with 20 parts by volume of pyridine and heated on the water bath for 1 hour. The cooled solution is mixed with ether, the ether-solution washed with dilute hydrochloric acid and water, dried and subjected to fractional distillation para-cymol of boiling point 172–174° C.

What we claim is:

1. In a process for the preparation of compounds with at least three conjugated double bonds, the steps of treating an olefin of the steroid series containing a system of conjugated carbon-carbon double bonds in a side-chain in the 17-position thereof and having, in α-position to the conjugated system a member of the group consisting of methylene and methine radicals and also having an acyloxy group in the 3-position with a member of the group consisting of an N-halogenated carboxylic acid imide, an N-halogenated carboxylic acid amide and an N-halogenated carboxylic acid arylamide, while exposing the reactants to the action of strong light, and splitting off hydrogen halide from the resultant halogen compound.

2. A process for the preparation of compounds with at least three conjugated double bonds, which comprises treating a $\Delta^{16:20}$-3-acyloxy-21-hydroxy-nor-choladienic acid lactone with N-bromo-succinimide while exposing the reactants to the action of strong light and splitting off hydrogen bromide from the resultant compound.

3. A process for the preparation of compounds with at least three conjugated double bonds, which comprises treating a $\Delta^{22:24}$-3-acyloxy-25:25-diphenyl-homo-choladiene with N-bromo-succinimide while exposing the reactants to the action of strong light and splitting off hydrogen bromide from the resultant compound.

4. A process for the preparation of oxidation products of compounds with at least three conjugated double bonds, which comprises treating a $\Delta^{22:24}$-3-acyloxy - 25:25 - diphenyl - homocholadiene with N-bromo-succinimide while exposing the reactants to the action of strong light, splitting off hydrogen bromide from the resultant compounds and subjecting the product to the action of chromium trioxide to split up the newly-formed double bond by oxidation.

5. Compounds of the steroid series, containing at least three conjugated carbon-carbon double bonds, at least one of which is in the side-chain in the 17-position, and also containing an acyloxy group in the 3-position.

6. The $\Delta^{14:16:20}$-3-acyloxy - 21 - hydroxy - nor-cholatrienic acid lactones.

7. The $\Delta^{17:22:24}$ - 3 - acyloxy - 25:25 - diphenyl-homocholatrienes.

CHARLES MEYSTRE.
PLACIDUS A. PLATTNER.
ALBERT WETTSTEIN.

REFERENCES CITED

The following references are of record in the file of this patent:

UNITED STATES PATENTS

| Number | Name | Date |
|---|---|---|
| 1,237,652 | Keyes | Aug. 21, 1917 |
| 2,130,084 | Groll et al. | Sept. 13, 1938 |
| 2,216,837 | Hartmann et al. | Oct. 8, 1940 |

FOREIGN PATENTS

| Number | Country | Date |
|---|---|---|
| 574,432 | Great Britain | Jan. 4, 1946 |

OTHER REFERENCES

Ellis et al.: The Chemical Action of Ultraviolet Rays (Reinhold Pub. Corp., New York, 1941), pp. 526, 537 and 541–548.

Ziegler et al.: Annalen, vol. 551, pp. 82 and 93–101 (1942).

Certificate of Correction

September 4, 1951

Patent No. 2,566,352

CHARLES MEYSTRE ET AL.

It is hereby certified that error appears in the printed specification of the above numbered patent requiring correction as follows:

Column 1, line 22, for "subsequently" read *subsequent*; lines 27 and 28, for "Ruzivka" read *Ruzicka*; lines 52 and 53, for "phelandrene" read *phellandrene*; same line 53, for "aerophtol" read *axerophtol*; column 6, line 2, for "bisulfide" read *bisulfite*; column 6, line 41, and column 7, lines 44 and 63, for "phelandrene" read *phellandrene*; same column 7, line 35, for "ethiocholane" read *etiocholane*; line 50, for "tertrachloride" read *tetrachloride*; line 74, after "distillation" insert *to obtain*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*